(12) United States Patent
Ross et al.

(10) Patent No.: US 12,541,393 B2
(45) Date of Patent: Feb. 3, 2026

(54) DYNAMIC POD PRIORITY INFERENCE UTILIZING SERVICE MESH TELEMETRY DATA

(71) Applicant: INTERNATIONAL BUSINESS MACHINES CORPORATION, Armonk, NY (US)

(72) Inventors: Martin A. Ross, Gosport (GB); Jack William Donato Evans, Rochester (GB); Luke James Powlett, Romsey (GB); Jack Richard William Stevenson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 17/935,592

(22) Filed: Sep. 27, 2022

(65) Prior Publication Data

US 2024/0103903 A1   Mar. 28, 2024

(51) Int. Cl.
*G06F 9/48* (2006.01)
*G06N 5/04* (2023.01)

(52) U.S. Cl.
CPC ............. *G06F 9/4818* (2013.01); *G06N 5/04* (2013.01)

(58) Field of Classification Search
CPC ................................ G06F 9/4818; G06N 5/04
See application file for complete search history.

(56) References Cited

U.S. PATENT DOCUMENTS

| | | |
|---|---|---|
| 11,188,561 B2 | 11/2021 | Natanzon |
| 2020/0412624 A1 | 12/2020 | Brown |
| 2021/0117249 A1 | 4/2021 | Doshi |
| 2021/0135983 A1* | 5/2021 | Farnham ............. H04L 43/0852 |
| 2021/0263779 A1* | 8/2021 | Haghighat ............ G06F 9/5061 |
| 2021/0326221 A1* | 10/2021 | Guim Bernat ...... G06F 11/0709 |

OTHER PUBLICATIONS

"Cluster-autoscaler", Autoscaler, Kubernetes, GritHub.com, Downloaded from the Internet on Apr. 6, 2022, 10 pgs., <https://github.com/kubernetes/autoscaler/tree/master/cluster-autoscaler>.
"Kiali—The Console for Istio Service Mesh", Kiali, Downloaded from the Internet on Apr. 6, 2022, 4 pgs., <https://kiali.io>.

(Continued)

*Primary Examiner* — Jacob D Dascomb
(74) *Attorney, Agent, or Firm* — Scott Dobson (57) ABSTRACT

Dynamically calculating and re-calculating priority values for a set of microservices that are deployed and run in a containerized environment. Before new priority values are assigned to the microservices, an initial default priority value is assigned to a microservice of interest. When the microservice of interest is deployed and run in the containerized environment, the generated telemetry data is used, in part, as a basis to determine a frequency in which any given microservice is being utilized, and more particularly, the microservice of interest. Based upon the determined frequency, a role for the microservice of interest can be inferred. As a result, this inferred role for the microservice of interest is used to dynamically assign a current priority value for the microservice of interest.

18 Claims, 6 Drawing Sheets

(56) References Cited

OTHER PUBLICATIONS

"Pod Priority and Preemption", Kubernetes Documentation Concepts, Scheduling, Preemption and Eviction, Last modified: Jan. 10, 2022, Downloaded from the Internet on Apr. 6, 2022, 6 pgs., <https://kubernetes.io/docs/concepts/configuration/pod-priority-preemption/>.

Sysdig, Custom Metrics, Collect Custom Metrics Using Prometheus, StatsD, and JMX to increase Visibility, Downloaded from the Internet on Apr. 6, 2022, 12 pgs., <https://sysdig.com/use-cases/microservices-monitoring/>.

Mell et al., "The NIST Definition of Cloud Computing", NIST National Institute of Standards and Technology U.S. Department of Commerce, Special Publication 800-145, Sep. 2011, 7 pages.

\* cited by examiner

DYNAMIC POD PRIORITY INFERENCE UTILIZING SERVICE MESH TELEMETRY DATA

BACKGROUND

The present invention relates generally to the field of microservices, and more particularly to solutions that allow enterprise-users to more efficiently use and manage microservices.

The Wikipedia Entry for "Microservices" (as of May 19, 2022) states as follows: "A microservice architecture—a variant of the service-oriented architecture (SOA) structural style—arranges an application as a collection of loosely-coupled services. In a microservices architecture, services are fine-grained and the protocols are lightweight. The goal is that teams can bring their services to life independent of others . . . . Therefore it allows organizations developing software to grow fast . . . as well as use off the shelf services easier. Communication requirements are reduced. But it comes at a cost to maintain the decoupling. Interfaces need to be designed carefully and treated as a public API."

The Wikipedia Entry for "Service mesh" (as of May 19, 2022) states as follows: "In software architecture, a service mesh is a dedicated infrastructure layer for facilitating service-to-service communications between services or microservices, using a proxy. A dedicated communication layer can provide a number of benefits, such as providing observability into communications, providing secure connections, or automating retries and backoff for failed requests. A service mesh consists of network proxies paired with each service in an application and a set of task management processes. The proxies are called the data plane and the management processes are called the control plane. The data plane intercepts calls between different services and "processes" them; the control plane is the brain of the mesh that coordinates the behavior of proxies and provides APIs for operations and maintenance personnel to manipulate and observe the entire network."

SUMMARY

According to an aspect of the present invention, there is a method, computer program product and/or computer system that performs the following operations (not necessarily in the following order): (i) identifying a plurality of microservices of a web application (ii) assigning a default priority value to a first microservice to be deployed in the web application, with the default priority value causing the first microservice to have a first priority when the first microservice is deployed; (iii) collecting, by a service mesh module, telemetry data of at least the first microservice; (iv) tracing routes of transaction identifications (IDs) between at least the first microservice and the plurality of microservices, with the routes of transaction IDs providing information indicative of a set of requests, and with the set of requests each having an associated identifying label; (v) responsive to the determination, inferring a role of the first microservice based, at least in part, upon the telemetry data and the traced routes of the transaction IDs; and (vi) responsive to inferring the role of the first microservice, determining a current priority value for the first microservice based, at least in part, upon the inferred role of the first microservice.

DETAILED DESCRIPTION

Some embodiments of the present invention are directed towards dynamically calculating and re-calculating priority values for a set of microservices that are deployed and run in a containerized environment. Before new priority values are assigned to the microservices, an initial default priority value is assigned to a microservice of interest. When the microservice of interest is deployed and run in the containerized environment, the generated telemetry data is used, in part, as a basis to determine a frequency in which any given microservice is being utilized, and more particularly, the microservice of interest. Based upon the determined frequency, a role for the microservice of interest can be inferred. As a result, this inferred role for the microservice of interest is used to dynamically assign a current priority value for the microservice of interest.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
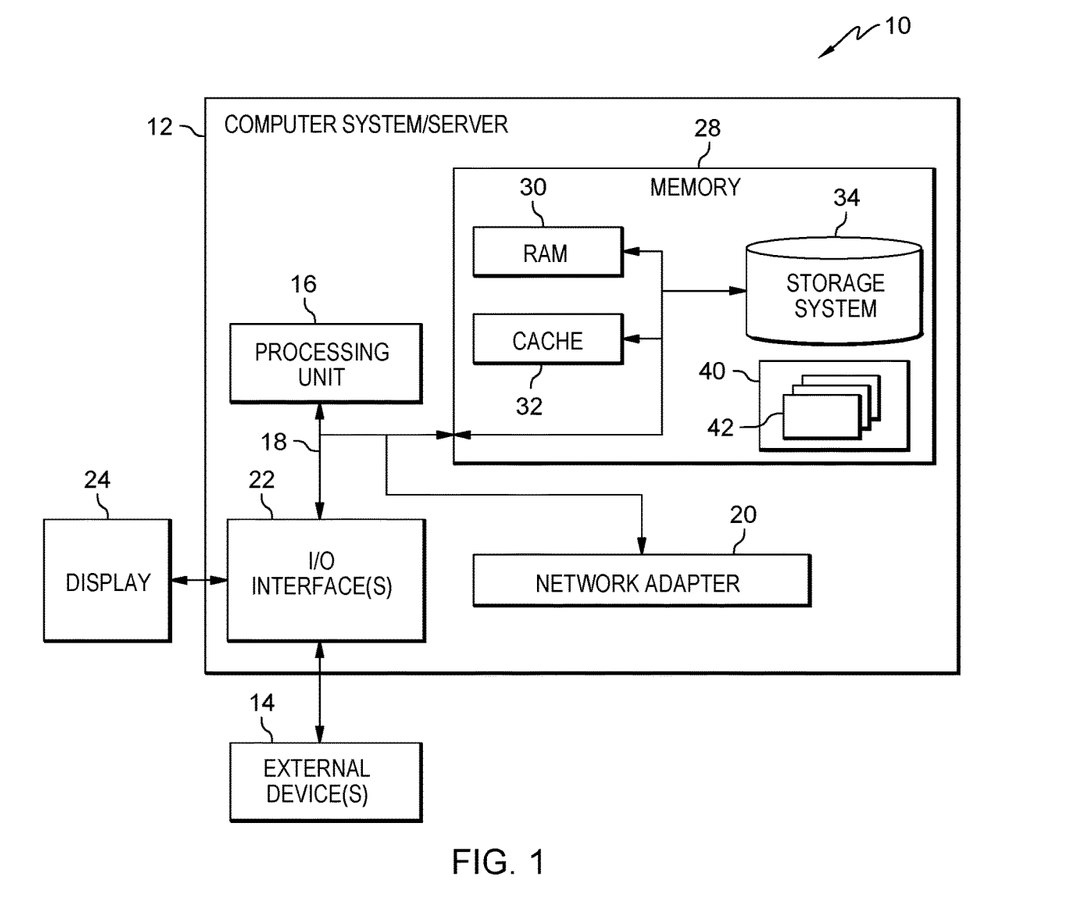
FIG. 1 depicts a cloud computing node used in a first embodiment of a system according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
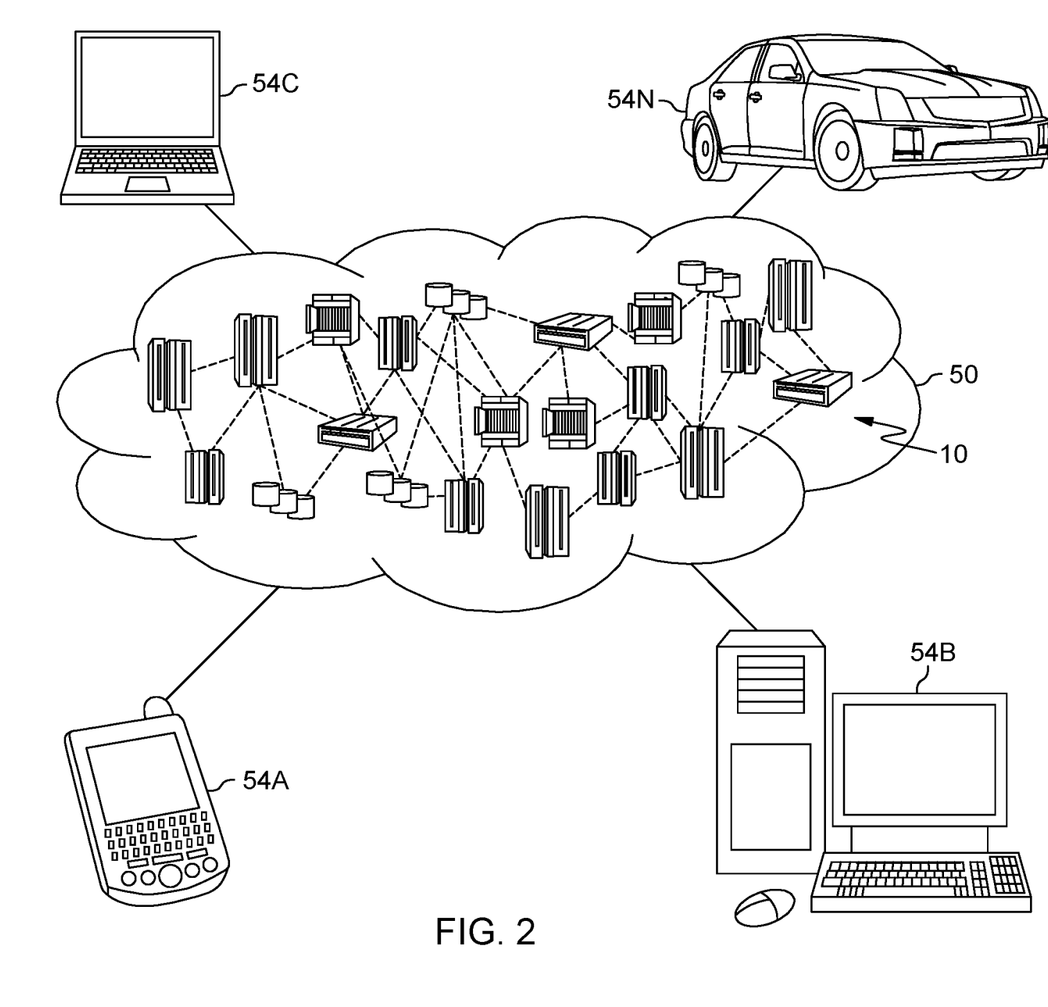
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
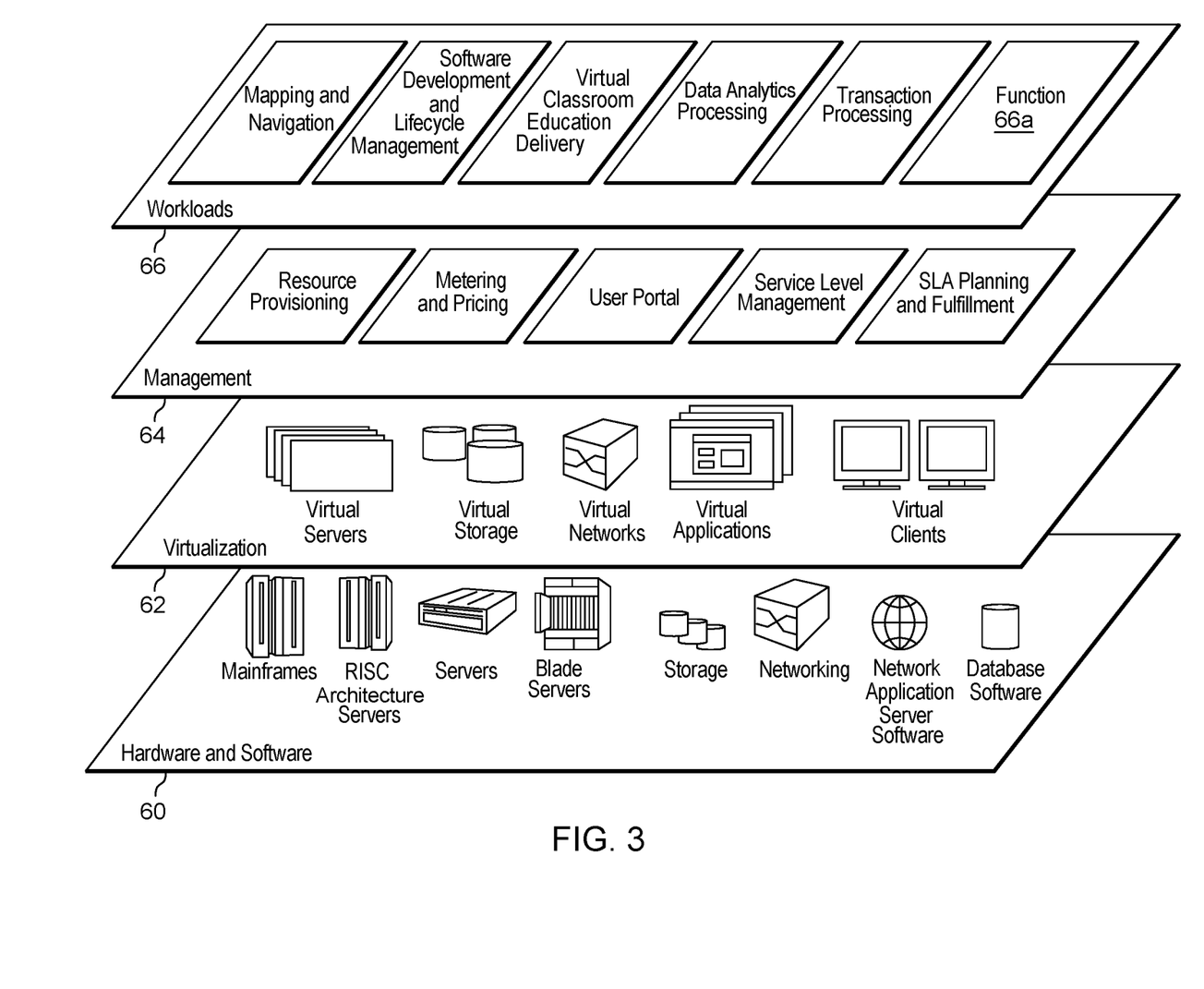
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 4:
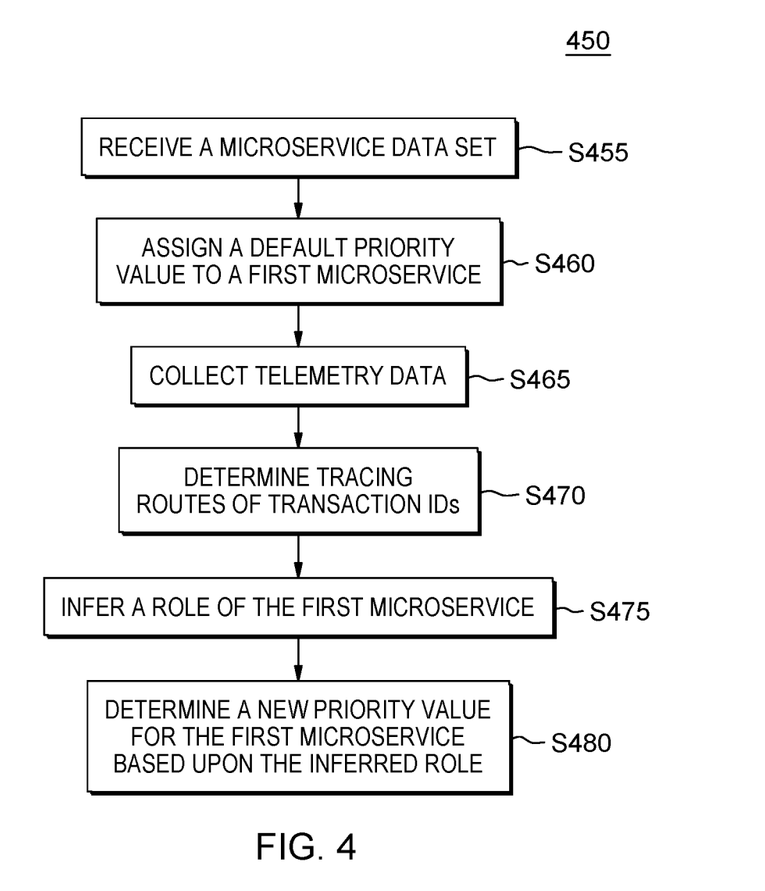
FIG. 4 is a flowchart showing a first embodiment method performed, at least in part, by the first embodiment system.
Figure 5:
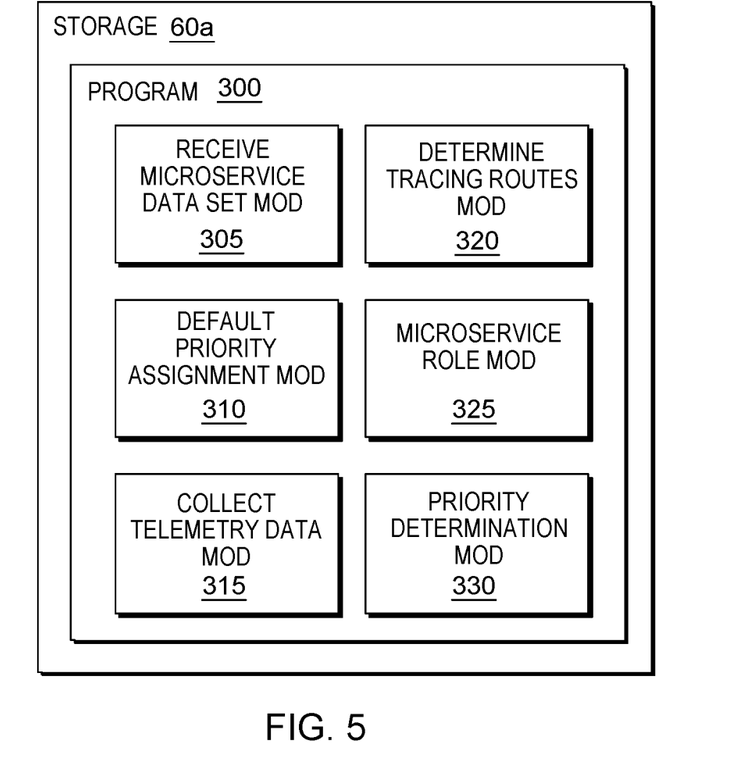
FIG. 5 is a block diagram showing a machine logic (for example, software) portion of the first embodiment system.

FIG. 4 shows flowchart 450 depicting a method according to the present invention. FIG. 5 shows program 300 for performing at least some of the method operations of flowchart 450. This method and associated software will now be discussed, over the course of the following paragraphs, with extensive reference to FIG. 4 (for the method operation blocks) and FIG. 5 (for the software blocks). One physical location where program 300 of FIG. 5 may be stored is in storage block 60a (see FIG. 3).

Processing begins at operation S455, where receive microservice data set ("mod") 305 receives a first microservice data set. In some embodiments of the present invention, the first microservice data set includes information that contains a plurality of identities of various microservices that are utilized or can potentially be utilized in a containerized environment. An example of a set of microservices that are utilized is shown in microservices diagram 600 of FIG. 6. In some embodiments, at the point in time in which these microservices are received by receive microservice data set mod 305, none of these microservices are assigned a priority value. Additionally or alternatively, at this same point in time, the microservices can have a previously assigned priority values; however, for the purposes of this example, these priorities can be reassigned based on the nature of the microservice being utilized (that is, the role that the microservice is relative to the other microservices in the distributed applications system).

Processing proceeds to operation S460, where default priority assignment mod 310 assigns a default priority value to at least one microservice in the first microservice data set (discussed in connection with operation S455, above). In some embodiments, the default priority for the first microservice is automatically set so that the first microservice has a top priority relative to other microservice that are utilized by the architectured web service. Additionally, or alternatively, default priority assignment mod 310 assigns the first microservice as having a last priority, or a randomized priority relative to the other microservices. In some embodiments, the microservice that is selected to have a default priority assigned is a microservice of interest. That is, the selected microservice can allow a user to test his or her hypothesis as to the true role or function that the selected microservice plays in the containerized environment.

Processing proceeds to operation S465, where collect telemetry data mod 315 collects telemetry data that is associated with the first microservice. As the various microservices are being run in the containerized environment, a set of telemetry data is being generated (that is, data that is being generated and communicated between and amongst the multiple microservices).

Processing proceeds to operation S470, where determine tracing routes mod 320 traces routes of transaction identifications (IDs) of the first microservice and all other microservices that are being utilized and/or monitored. In some embodiments, mod 320 traces the routes of the transaction IDs of the various microservices based upon the communicated data included in the telemetry data (discussed in connection with operation S265, above). In some embodiments, route tracing helps to identify a frequency of transaction IDs that are being utilized. That is, it is possible to ultimately determine which microservices are being heavily utilized and which microservices are being relatively underutilized.

This information can: (i) serve as the basis for re-assigning the default priority value for a given microservice to adequately reflect a correct priority for a microservice based upon its usage; and (ii) allow a potential role for the given microservice to be accurately inferred.

Additionally or alternatively, determine tracing routes mod 320 determines: (i) a number of request(s) that were sent among and between the various microservices; (ii) the content of the request(s); and (iii) and identifying information that is associated with each determined request (such as a tag or label).

Processing proceeds to operation S475, where microservice role mod 325 determines or infers a role for the first microservice. In some embodiments, microservice role mod 325 determines the role for the first microservice based upon the telemetry data (discussed in connection with operation S465, above), the traced routes of transaction IDs (discussed in connection with operation S470, above), and/or alternative factors. These alternative factors can include: (i) the number of microservices that are calling on the functionality of the first microservice; (ii) the relative priorities of the microservices that are calling on the functionality of the first microservice; (iii) the number of requests that the first microservice is sending and/or receiving from the other microservices; and/or (iv) the specific identities of the microservices that are calling on the functionality of the first microservice.

Processing finally proceeds to operation S480, where priority determination mod 330 determines a new priority value for the first microservice based upon its inferred role (discussed in connection with operation S475, above). In some embodiments, priority determination mod 330 periodically or intermittently calculates and re-calculates a new priority value for a given set of microservices as the microservices are being continually run in the containerized environment.

III. FURTHER COMMENTS AND/OR EMBODIMENTS

In a microservice architecture web application where a containerized platform such as Kubernetes and a service mesh such as Istio is typically utilized, it is possible to collect telemetry data from the sidecars that display the incoming requests to each of the services. The problem typically arises as a web application grows in both microservices and popularity/throughput, a strain develops on the available resources as microservices are horizontally scaled to deal with throughput.

For the currently unbound budget web application, an easy solution is to just install an autoscaler on the cluster; however, this can lead to an increased cost of running the service because microservices are not always receiving a large amount of requests and the number of replicas of an application remain the same.

For the bound budget web application, it is more difficult because these applications can only be budgeted for a certain number and/or size of workers for their microservice architectured web application. A solution called "Pod Priority" currently exists. This means that an engineer and/or developer can define how important a microservice is compared to the rest of the architecture of the microservice architected web application.

This introduces a few problems, including: (i) pod priority cannot always be fixed because this results in the same issue that it is trying to solve; (ii) there is no reactive process to an increased throughput across the service or to individual microservices; (iii) if it is fixed and a large increase in throughput is observed, an operations engineer and/or a SRE has to edit and increase the pod priority of the affected service to show its more important and hence can lead to less important services being evicted from the cluster; and (iv) if changes are made to the pod priority resource, then these changes have to be reflected back in the helm chart or Kubernetes resource definitions for the microservice.

A solution is needed that enables pod priority to dynamically change based on a feature usage within a given microservice.

By using a service mesh, embodiments of the present invention collect telemetry data on the requests being made inside the containerized environment (such as the transaction IDs between microservices). Based on the routes and/or request paths of the calls, the pod priorities of components can be adjusted automatically such that there is sufficient instances of a determined core component and/or microservice to deal with the load. This ensures that services that impact the broadest set of functionality are prioritized appropriately.

Example embodiments of the present invention working in a containerized environment such as Kubernetes with a service mesh may include the following operations:

(1) When a new component is deployed, some embodiments of the present invention create a "PriorityClass" object at a default value that is applied to that component only. For example, if a component called deployment-A is deployed, then the system will create the following PriorityClass and apply it to deployment A:

apiVersion: scheduling.k8s.io/v1
kind: PriorityClassmetadata:
name: deployment-A-priority
value: 1000000
globalDefault: false
description: "This is the priority class for deployment-A"

(2) Some embodiments of the present invention begin to collect telemetry data, tracing the routes of transaction IDs from one microservice to another.

(3) Some embodiments of the present invention build a model of the routes taken by requests through the containerized microservice-architectured environment.

(4) Some embodiments of the present invention identify, for example, the following information: (i) microservice B receives a larger proportion of requests than other microservices, but because it does not make any calls out, microservice B is likely providing only a small subset of functionality, so any downtime is of small impact; and (ii) microservice F in comparison to microservice B is receiving only 85 requests per second, which is relatively small, but microservice F is a dependency of three (3) other microservices, and therefore the impact of the downtime of microservice F is broader across the service than downtime of microservice B.

(5) Some embodiments of the present invention make the changes to increase the pod priority of microservice F and decrease microservice B in response to the recognition that the impact of the downtime of microservice F is broader across the service than downtime of microservice B.

(6) Some embodiments of the present invention return to operation (3) and continue (as workload changes during the day/week, different priorities would apply to different parts of the distributed application).

There are many methods to calculate the changes to priority. In operation (4), one such method includes ranking each microservice by calculating a microservice score. In this example, the microservice score is a sum of inbound throughput multiplied by (1+number of inbound edges divided by 10).

Figure 6:
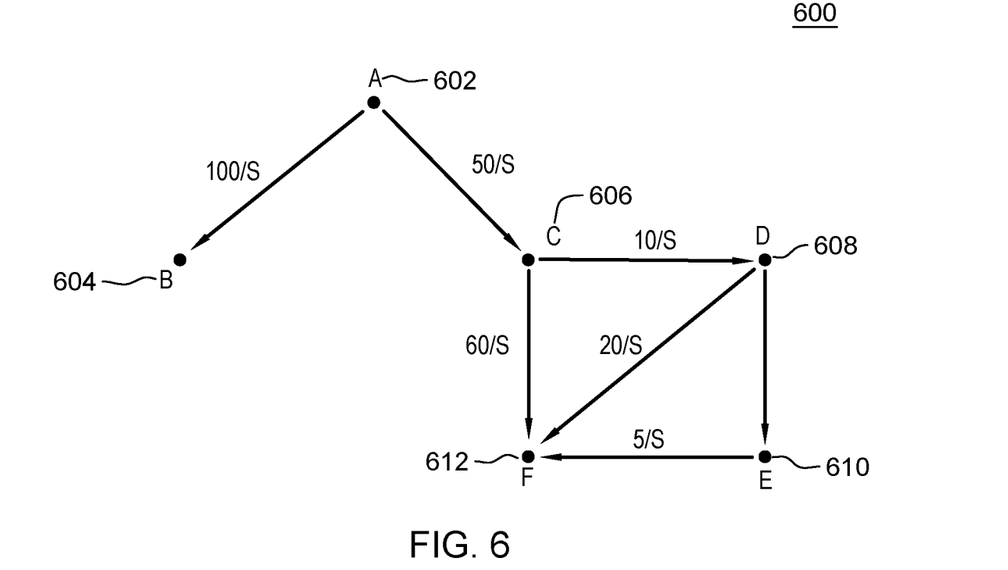
FIG. 6 is a microservices diagram showing information that is helpful in understanding some embodiments of the present invention.

Microservices diagram 600 of FIG. 6 includes the following: microservice A 602, microservice B 604, microservice C 606, microservice D 608, microservice E 610, and microservice F 612. This would give the following microservice scores in the example (as shown in microservices diagram 600 of FIG. 6):

Microservice $A=180*(1+1/10)=198$

Microservice $B=100*(1+1/10)=110$

Microservice $C=80*(1+1/10)=88$

Microservice $D=50*(1+2/10)=60$

Microservice $E=85*(1+3/10)=110.5$

Accordingly, the priority order is A, E, B, C, D, and a weighting may then be applied such that priority A=2, priority E=1, priority B=0, priority C=−1, priority D=−2.

This is an approximated sample calculation, but it illustrates a process according to some embodiments of the present invention. Other examples may be directed to ensuring that the associated priorities reflect a rolling average of scores over a given window, or are newly calculated at intervals that do not take prior calculations into account. Other examples may also be directed to using different properties to rank services—such as whether the service is publicly accessible or whether the service is internal, or the percentage of unique transactions the service participates in within the distributed application.

An extension on operation (1) may include the following: if the component utilizes a management tool for orchestrating applications in Kubernetes, the changes could be merged back into the component's repository.

Another extension may be to include and utilize a priority field in the messages being sent between services, which can be included in the header, in order to specify the importance of the message being sent by way of an importance value. The specified importance value also be factored into the calculations to infer service priority levels as workload changes. For example, an insight microservice may receive messages from many sources to give teams an indication of what function is being used, and in the above calculations this may rank highly. When a factor is not important to a service functioning, a "low priority" on the messages sent would allow unimportant factors to be recognized in the model.

Some embodiments of the present invention recognize the following characteristics, features, and/or advantages: (i) microservice architecture product changes priority dynamically based on the workload at the time, so as the architecture changes with development or processes different workloads throughout the day, the pod priorities would change to reflect these changes; and (ii) decreased running costs because the containerized environment can be run with less worker nodes to accommodate all the instances of running applications.

Some embodiments of the present invention provide a system to dynamically modify microservice priority in a distributed application based on telemetry data and/or distributed tracing. In addition, some embodiments calculate a priority for a particular microservice taking into account its inferred role within the distributed application rather than basing a priority that is set statically or only based on observed throughput (for example, by using a number of messages processed, source of the messages, number of sources, message priority, etc.).

Some embodiments of the present invention are directed to determining a current priority value as a pod priority for a target microservice for a web application. When the current priority value is determined, each other microservice for the web application has a respectively corresponding pod priority value modified such that the priority order established among the plurality of microservices and the target microservice is revised.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   identifying a plurality of microservices of a web application;
   assigning a default priority value to a first microservice to be deployed in the web application, with the default priority value causing the first microservice to have a first priority when the first microservice is deployed;
   collecting, by a service mesh module, telemetry data of at least the first microservice;
   tracing routes of transaction identifications (IDs) between at least the first microservice and the plurality of microservices, with the routes of transaction IDs providing information indicative of a set of requests, and with the set of requests each having an associated identifying label;
   inferring a role of the first microservice based, at least in part, upon the telemetry data and the traced routes of the transaction IDs;
   responsive to inferring the role of the first microservice, determining a current priority value for the first microservice based, at least in part, upon the inferred role of the first microservice;
   assigning the current priority to the first microservice; and
   scheduling the first microservice based on the current priority.

2. The CIM of claim 1 wherein the traced routes of the transaction IDs between the first microservice and the plurality of microservices indicates a usage frequency of the first microservice relative to the plurality of microservices.

3. The CIM of claim 1 wherein inferring the role of the first microservice is further based upon a number of microservices calling upon the first microservice.

4. The CIM of claim 1 wherein inferring the role of the first microservice is further based upon a dynamically determined priority value.

5. The CIM of claim 1 further including:
   responsive to the determination of the current priority value for the first microservice, re-calculating respectively corresponding priority values for each microservice in the plurality of microservices based upon change in priority value of the first microservice.

6. The CIM of claim 1 wherein determining the current priority value for the first microservice is further based upon information included in a priority field of a set of messages being sent between at least the first microservice and the plurality of microservices.

7. A computer program product (CPP) comprising:
   one or more computer readable storage media; and
   computer code stored on the one or more computer readable storage media, with the computer code including instructions and data for causing a processor set to perform operations comprising:
   identifying a plurality of microservices of a web application;

assigning a default priority value to a first microservice to be deployed in the web application, with the default priority value causing the first microservice to have a first priority when the first microservice is deployed, collecting, by a service mesh module, telemetry data of at least the first microservice, tracing routes of transaction identifications (IDs) between at least the first microservice and the plurality of microservices, with the routes of transaction IDs providing information indicative of a set of requests, and with the set of requests each having an associated identifying label, inferring a role of the first microservice based, at least in part, upon the telemetry data and the traced routes of the transaction IDs, responsive to inferring the role of the first microservice, determining a current priority value for the first microservice based, at least in part, upon the inferred role of the first microservice, assigning the current priority to the first microservice, and scheduling the first microservice based on the current priority.

8. The CPP of claim 7 wherein the traced routes of the transaction IDs between the first microservice and the plurality of microservices indicates a usage frequency of the first microservice relative to the plurality of microservices.

9. The CPP of claim 7 wherein inferring the role of the first microservice is further based upon a number of microservices calling upon the first microservice.

10. The CPP of claim 7 wherein inferring the role of the first microservice is further based upon a dynamically determined priority value.

11. The CPP of claim 7, wherein the operations further comprise:
responsive to the determination of the current priority value for the first microservice, re-calculating respectively corresponding priority values for each microservice in the plurality of microservices based upon change in priority value of the first microservice.

12. The CPP of claim 7 wherein determining the current priority value for the first microservice is further based upon information included in priority field of a set of messages being sent between at least the first microservice and the plurality of microservices.

13. A computer system (CS) comprising:
a processor set;
one or more computer readable storage media; and
computer code stored on the one or more computer readable storage media, with the computer code including instructions and data for causing the processor set to perform operations comprising:
identifying a plurality of microservices of a web application;
assigning a default priority value to a first microservice to be deployed in the web application, with the default priority value causing the first microservice to have a first priority when the first microservice is deployed,
collecting, by a service mesh module, telemetry data of at least the first microservice,
tracing routes of transaction identifications (IDs) between at least the first microservice and the plurality of microservices, with the routes of transaction IDs providing information indicative of a set of requests, and with the set of requests each having an associated identifying label,
inferring a role of the first microservice based, at least in part, upon the telemetry data and the traced routes of the transaction IDs,
responsive to inferring the role of the first microservice, determining a current priority value for the first microservice based, at least in part, upon the inferred role of the first microservice,
assigning the current priority to the first microservice, and
scheduling the first microservice based on the current priority.

14. The CS of claim 13 wherein the traced routes of the transaction IDs between the first microservice and the plurality of microservices indicates a usage frequency of the first microservice relative to the plurality of microservices.

15. The CS of claim 13 wherein inferring the role of the first microservice is further based upon a number of microservices calling upon the first microservice.

16. The CS of claim 13 wherein inferring the role of the first microservice is further based upon a dynamically determined priority value.

17. The CS of claim 13, wherein the operations further comprise:
responsive to the determination of the current priority value for the first microservice, re-calculating an updated priority value for each remaining microservice(s) in the plurality of microservices.

18. The CS of claim 13 wherein determining the current priority value for the first microservice is further based upon information included in priority field of a set of messages being sent between at least the first microservice and the plurality of microservices.

* * * * *